United States Patent
Herse et al.

(10) Patent No.: US 12,503,082 B2
(45) Date of Patent: Dec. 23, 2025

(54) BAFFLE ASSEMBLY

(71) Applicant: GM Cruise Holdings LLC, San Francisco, CA (US)

(72) Inventors: Nathaniel Barrett Herse, San Francisco, CA (US); Michael Shagam, San Francisco, CA (US); Hui Li, San Jose, CA (US); Kevin Sheppard, Oakland, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 711 days.

(21) Appl. No.: 17/890,074

(22) Filed: Aug. 17, 2022

(65) Prior Publication Data
US 2024/0059255 A1   Feb. 22, 2024

(51) Int. Cl.
| | | |
|---|---|---|
| *B60S 1/56* | (2006.01) | |
| *B60S 1/52* | (2006.01) | |
| *B60S 1/54* | (2006.01) | |
| *G01S 7/497* | (2006.01) | |
| *G01S 17/931* | (2020.01) | |
| *H04N 23/52* | (2023.01) | |

(52) U.S. Cl.
CPC . *B60S 1/56* (2013.01); *B60S 1/52* (2013.01); *B60S 1/54* (2013.01); *G01S 2007/4977* (2013.01); *G01S 17/931* (2020.01); *H04N 23/52* (2023.01)

(58) Field of Classification Search
CPC .............. H04N 23/52; G01S 17/931; G01S 2007/4977; G01S 7/4813; B60S 1/56; B60S 1/52; B60S 1/54
See application file for complete search history.

(56) References Cited

U.S. PATENT DOCUMENTS

| | | | | |
|---|---|---|---|---|
| 11,156,485 | B1 * | 10/2021 | Krishnan | B60R 11/00 |
| 11,486,970 | B1 * | 11/2022 | Schmidtlin | G02B 27/142 |
| 11,493,922 | B1 * | 11/2022 | Avram | G01S 17/931 |
| 2021/0086727 | A1 * | 3/2021 | Bopp | B08B 3/02 |
| 2021/0088668 | A1 * | 3/2021 | Hahn | G01S 7/4813 |
| 2021/0309187 | A1 * | 10/2021 | Rice | G01S 7/4813 |
| 2022/0331844 | A1 * | 10/2022 | Garg | B08B 3/041 |
| 2022/0349998 | A1 * | 11/2022 | Halbritter | G01S 7/499 |
| 2022/0390568 | A1 * | 12/2022 | Kubota | G01S 17/89 |

* cited by examiner

*Primary Examiner* — Twyler L Haskins
*Assistant Examiner* — John H Morehead, III
(74) *Attorney, Agent, or Firm* — CANTOR COLBURN LLP

(57) ABSTRACT

Systems and methods are provided for a baffle assembly for an optical sensor. In one aspect, the baffle assembly is coupled to an optical sensor that is mounted on an autonomous vehicle. The baffle assembly can include a baffle housing coupled to the optical sensor at a proximal edge, and configured to at least partially enclose a field of view of the optical sensor. Additionally, the baffle assembly may include one or more nozzles that are configured to project fluid toward a surface of a lens of the optical sensor.

18 Claims, 6 Drawing Sheets

BAFFLE ASSEMBLY

BACKGROUND

1. Technical Field

The present disclosure generally relates to a baffle assembly and, more specifically, to a baffle assembly for an optical sensor that is mounted on an autonomous vehicle.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
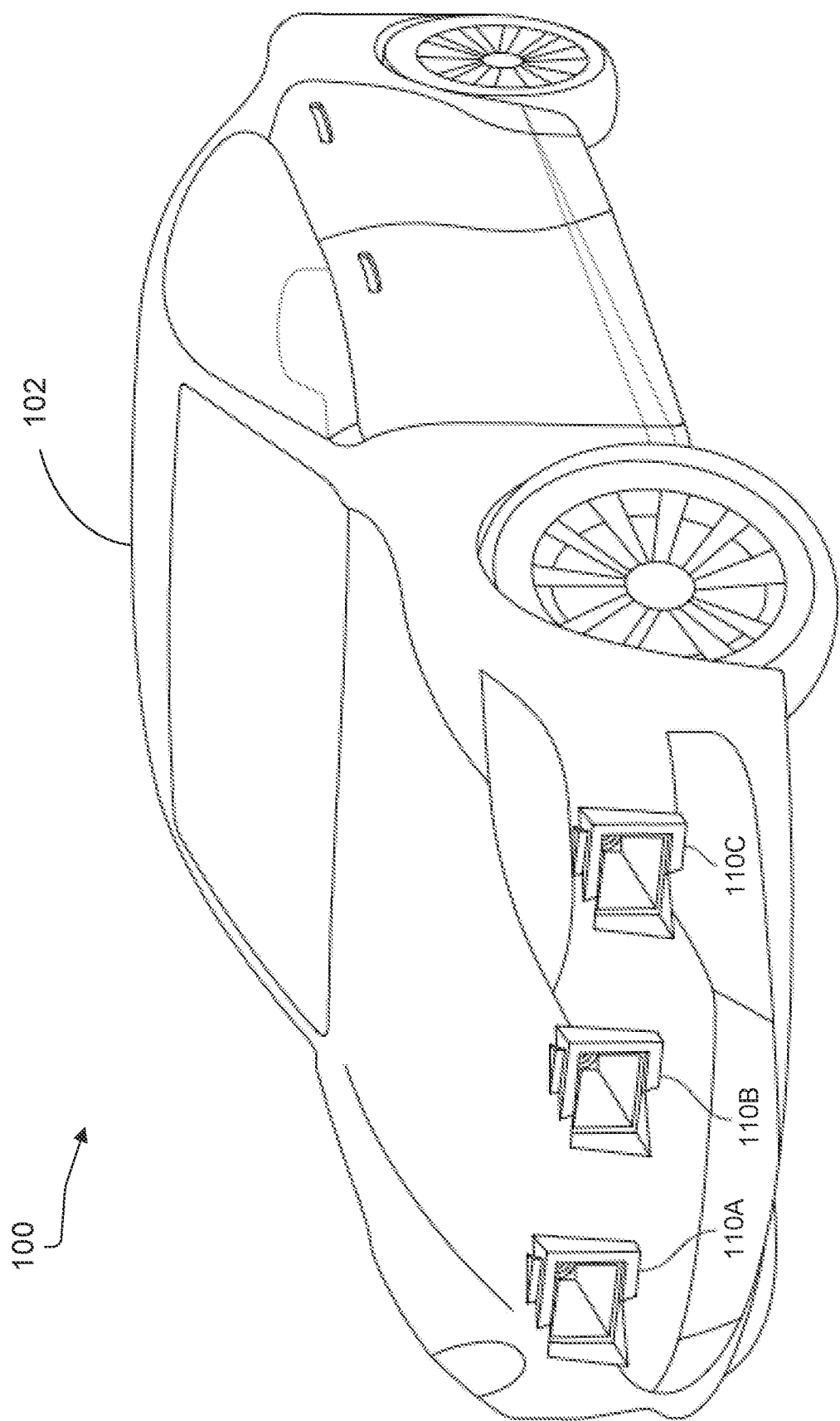
FIG. 1 illustrates an example environment in which a baffle assembly is mounted on an autonomous vehicle, according to some aspects of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

As previously explained, autonomous vehicles (AVs) can include various sensors, such as a camera sensor, a LIDAR sensor, and/or a RADAR sensor, amongst others, which the AVs can use to collect data and measurements that are used for various AV operations. The sensors can provide the data and measurements to an internal computing system of the autonomous vehicle, which can use the data and measurements to control mechanical systems of the autonomous vehicle, such as a vehicle propulsion system, a braking system, and/or a steering system, etc. Sensors play an essential role in automated driving as they allow vehicles to monitor their surroundings, detect oncoming obstacles, and safely plan their paths.

Optical sensors convert light rays into electronic signals. In AV applications, optical sensors are commonly employed to facilitate object detection by measuring a physical quantity of light and, depending on the type of sensor, translating the measured incident light into a form that is readable by an integrated measuring device, such as charge-coupled device. Even for well-designed optical sensors, unintended or undesirable light may reach the focal plane of the sensor. Such light rays can result in, for example, the addition of unwanted light or bright spots to a resulting image, thereby reducing the sensitivity of object detection. Furthermore, weather conditions (e.g., rain, fog, or snow), road conditions, or any other driving conditions (e.g., dust or smoke) can affect the accuracy and effectiveness of optical sensors. For example, a lens of an optical sensor can be exposed to a variety of outdoor contaminants that may affect its ability to view and create a clear image of an object. Therefore, there exists a need for an integrated system for an optical sensor that can not only prevent unintended/undesirable light from entering the optical sensor but also comprises a cleaning system to clean the lens of the optical sensor to provide a clear view.

The present technology includes systems and techniques for solving these problems and discrepancies, among others. More specifically, systems and techniques are provided herein for a baffle assembly for an optical sensor that includes a cleaning system. In some aspects, a baffle assembly can be coupled to an optical sensor that is mounted on an autonomous vehicle (e.g., camera, LIDAR sensor, or any applicable optical sensor on an autonomous vehicle). In some examples, a cleaning system of a baffle assembly may be configured to clean a lens of the optical sensor.

Figure 5:
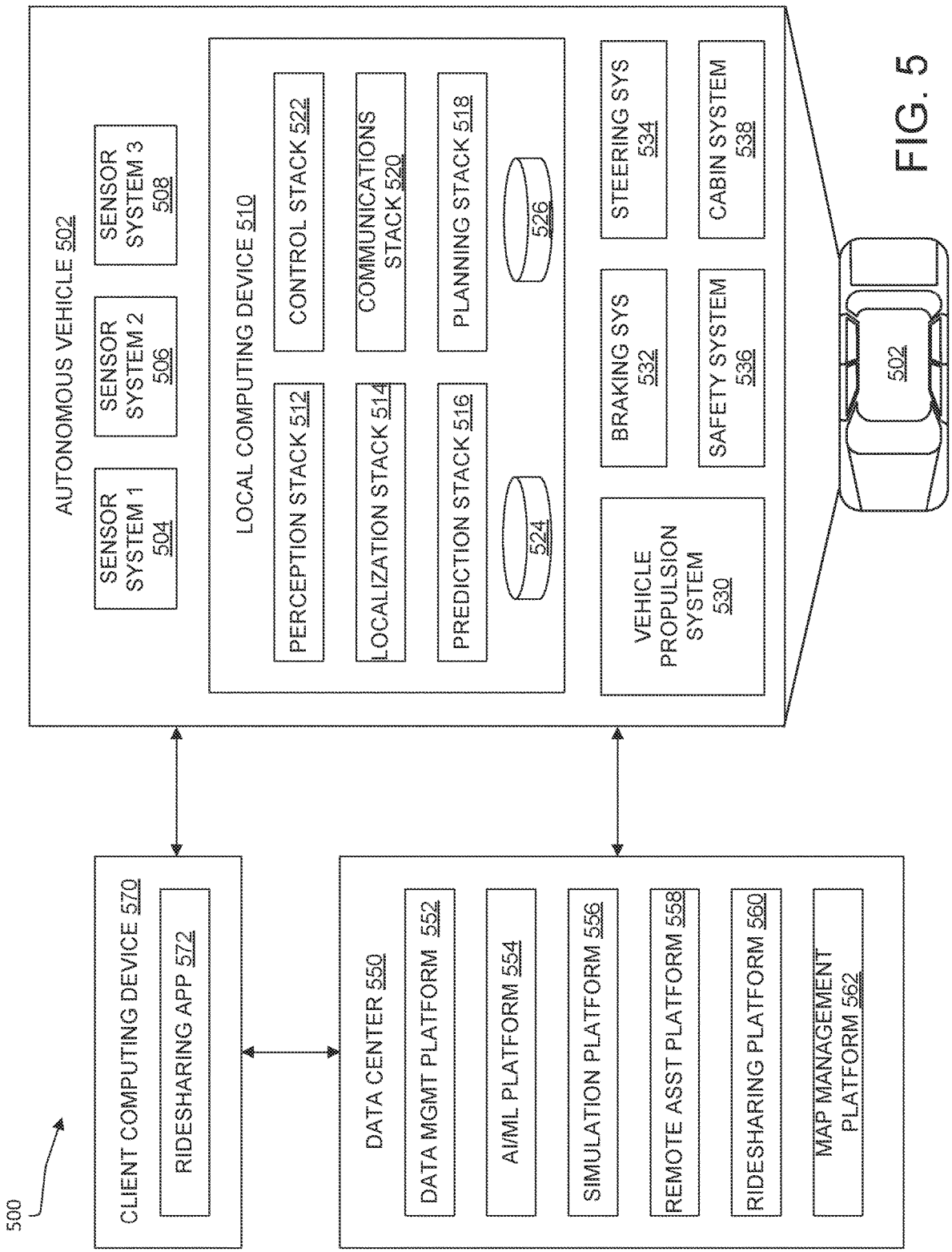
FIG. 5 illustrates an example of a system for managing one or more AVs in accordance with some aspects of the present technology.

FIG. 1 illustrates an example environment 100 in which a baffle assembly 110A, 110B, 110C (collectively, baffle assembly 110) is coupled to an optical sensor of a vehicle 102. While the present disclosure is discussed in the context of a baffle assembly (e.g., baffle assembly 110 of FIG. 1) implemented on a vehicle for exemplary purposes, a baffle assembly of the present disclosure can be utilized in a vehicle or a non-vehicle that has an optical sensor. Further, non-limiting examples of vehicle 102 can include autonomous vehicles (similar to autonomous vehicle 502 as illustrated in FIG. 5), automobiles, motorcycles, trains, bicycles, railed vehicles, watercraft, and/or aircraft.

In some examples, baffle assembly 110 can be coupled to an optical sensor that is mounted on vehicle 102. The location and/or position of the optical sensor on vehicle 102 can be various depending on its functionality (e.g., on top or roof, on the bottom, on the front, at the rear, at each side, at the front or rear window or tailgate, behind the grille, near the rearview mirror, under the side mirrors, etc.).

As described herein, baffle assembly 110 is configured to inhibit unintended or undesirable light (i.e., stray light) from being incident upon the optical sensor. Any light rays that enter the optical sensor through an unintended path before reaching the focal plane can result in ghosts (e.g., unintended reflections from optical surfaces or secondary imaging of bright sources/objects) or veiling glare (e.g., light incident on the image from outside of the field of view (FoV) of the optical sensor, bright sources within the field-of-view, or light scattering within the optical sensor such as dirty or damaged lens surfaces). Baffle assembly 110 is configured to block the paths taken by stray light rays such as 0th order out-of-field paths, $1^{st}$ order out-of-field paths from out-of-field sources, and/or $1^{st}$ order out-of-field paths from vehicle 102. Sources of stray light can be external such as the Sun, or other manmade bright light sources such as headlights from oncoming vehicles or even traffic lights. Sometimes stray light can be internally originated, such as from the headlight or brake lights of vehicle 102.

Figure 2:
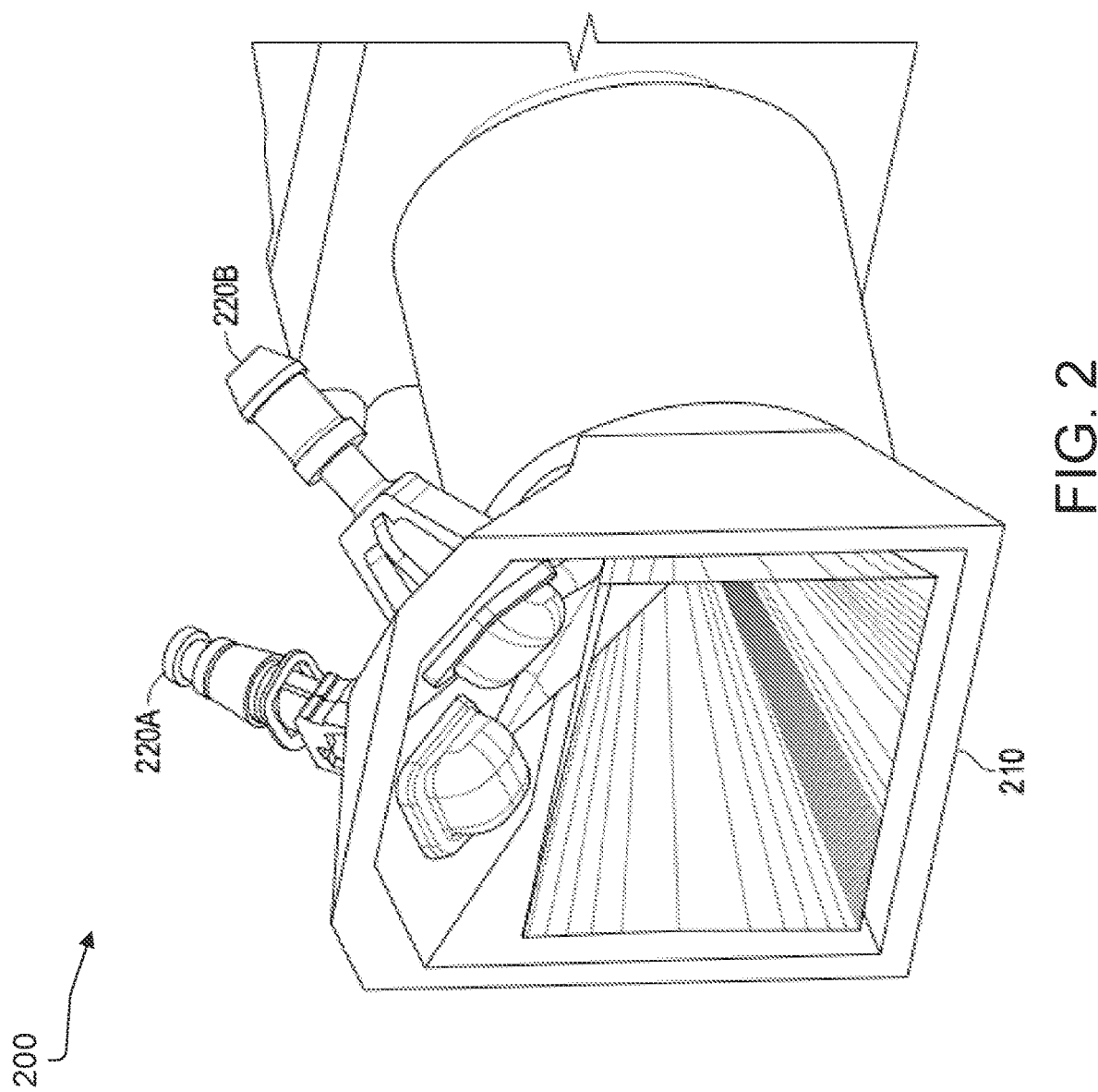
FIG. 2 illustrates an example baffle assembly for an optical sensor, according to some aspects of the present disclosure.

In FIG. 2, the disclosure now turns to a further discussion of a baffle assembly 200 (similar to baffle assembly 110 as illustrated in FIG. 1) for an optical sensor. As shown in FIG. 2, baffle assembly 200 comprises a baffle housing 210 and nozzles 220A and 220B (collectively, nozzles 220).

In some examples, baffle housing 210 is coupled to an optical sensor (e.g., optical sensor 230 shown in FIG. 3A) at a proximal edge. Baffle housing 210 is configured to at least partially enclose a FoV (e.g., FoV 240 shown in FIG. 3B) of the optical sensor to prevent unintended rays of light from reaching the focal plane or the lens of the optical sensor.

In some examples, at least a part of an inner surface of baffle housing 210 is configured to diffuse incident light. In some examples, an interior surface of baffle housing 210 can be rough or coarse to diffuse reflections (scattering) and decrease the irradiance, for example, by spreading the energy over more angles on the surface. Surface treatments can be applied onto the surface of baffle housing 210 to generate a uniform texture and to facilitate light scattering.

Further, in some examples, at least a part of an inner surface of baffle housing 210 is opaque to diffuse reflection of light coming from outside of the field of view of the optical sensor or any unintended light reaching the focal plane of the optical sensor. In some examples, an interior surface of baffle housing 210 can include a matte black finish configured to maximally absorb stray light and minimize reflections.

In some aspects, baffle housing 210 has a temperature controllable surface. The surface of baffle housing 210 can be heated to evaporate the moisture inside or snow around/within baffle housing 210, for example, when snow or ice flakes get accumulated inside baffle housing 210. The temperature controllable surface of baffle assembly 200 can, by being able to clean the lens from accumulations that may be avoidably caused by certain weather conditions, improve the target detectability and accuracy of the optical sensor.

In some aspects, nozzles 220 are coupled to baffle housing 210. Nozzles 220 can be part of a cleaning system for the optical sensor and baffle assembly 200 itself. Nozzles 220 are configured to project fluid toward a surface of a lens (e.g., lens 235 shown in FIGS. 3A and 3B) of the optical sensor. More specifically, nozzles 220 can project liquid or gas towards the surface of the lens. For example, nozzle 220A can be a liquid cleaning nozzle. Nozzle 220A can project any applicable liquid (e.g., a cleaning solution) toward the surface of the lens to wash off any dirt, debris, or accumulations on the surface of the lens. In some examples, nozzle 220B can be a compressed-air or gas drying nozzle. Nozzle 220B can disperse compressed air or gas toward the surface of the lens to dry moisture or blow off debris on or near the surface of the lens.

In some aspects, nozzle(s) 220 are positioned outside of the field of view of the optical sensor. Further, nozzle(s) 220 are located proximate to the lens of the optical sensor.

In some aspects, nozzle(s) 220 have a textured surface to reduce the reflection of light on the surface of nozzle(s) 220. For example, the outer surface of nozzle(s) 220 can be rough or coarse to diffuse reflections of light on the surface (e.g., specular reflections). Surface treatment can be applied to the surface of nozzle(s) to provide a textured surface.

In some examples, nozzle(s) 220 are configured to clean the inner surface of baffle housing 210. Nozzles 220A and 220B that are configured to clean the surface of the lens, as described above, can be further configured to clean the interior surface of baffle housing 210. For example, nozzles 220 can project fluid (e.g., liquid, compressed-air, and/or gas) over a wide region that covers the lens of the optical sensor and at least a part of the inner surface of baffle housing 210. In other examples, an additional nozzle can be attached to baffle housing 210 solely for cleaning the inner surface of baffle housing 210.

While baffle assembly 200 as described in FIG. 2 comprises two nozzles 220A and 220B, any applicable number of nozzles can be coupled to baffle assembly 200 to optimize the cleaning of the optical sensor or any part of baffle assembly 200.

In some aspects, baffle assembly 200 is configured to be coupled to an optical sensor that is mounted on an AV (similar to AV 502 as illustrated in FIG. 5). In some examples, the optical sensor can include a camera (e.g., a visible imaging sensor/visible camera, a Near Infrared (NIR) sensor, a Short-wave Infrared (SWIR) sensor, a Long-wave Infrared (LWIR) sensor, a monocular camera, or stereo camera), a LIDAR sensor, and/or a combination thereof. Baffle assembly 200 (or baffle housing 210) is positioned in a way not to block any view on a vehicle. For example, there should not be any straight line that can be drawn between a part of the vehicle body, applique, or light to the front surface of the lens.

In some aspects, baffle assembly 200 includes a removable awning (not shown in FIG. 2) coupled to a distal edge of baffle housing 210. For example, a removable awning can be a cover extending over at a distal edge of baffle housing 210. In some examples, for an optical sensor that has a wide FoV, baffle assembly 200 can include a removable awning on the distal edge of baffle housing 210 to help block stray light. In other examples, an appropriate size of a removable awning can be determined based on the size of nozzle(s) 220. For example, bigger size of nozzles may require baffle housing 210 to have a wider top surface (i.e., upper quadrant of baffle housing 210) to mount nozzles. The wider top of baffle housing 210 may allow more stray light to get into the optical sensor. As follows, a removable awning coupled to the distal edge of baffle housing 210 can help inhibit stray light from being incident upon the optical sensor.

In some examples, a removable awning can be installed onto baffle housing 210 after nozzle(s) 220 are coupled to baffle housing 210 so that a position of the removable awning to minimize stray light coming into the lens can be best achieved.

In some aspects, baffle assembly 200 includes a drain port (not shown in FIG. 2) along the bottom side of baffle housing 210 below the lens of the optical sensor. In some examples, with a frustum-shaped baffle housing, baffle housing 210 has a sloped bottom so that any liquid or droplets (e.g., water, cleaning solution, etc.) can drain out from baffle housing 210. In other examples, a drain port can be apertures or cutouts on and/or along the bottom surface of baffle housing 210.

In some aspects, baffle assembly 200 includes one or more ventilation holes (not shown in FIG. 2) configured to permit airflow across the lens of the optical sensor. Further ventilation holes can be used for thermal control of the optical sensor. Ventilation holes can be located on the bottom of baffle housing 210 or the back of the lens of the optical sensor to effectively permit airflow across the lens of the optical sensor and within baffle housing 210.

Baffle assembly 200 can be attached to the optical sensor in various ways. In some examples, baffle assembly 200 includes holes to receive pins (e.g., long dowel pins) that extend out of an optical sensor. Baffle assembly 220 can, via holes, locate pins coming from an optical sensor through a mounting bracket and into baffle assembly 220. As follows, the distance between baffle assembly 220 and an optical sensor can be minimized, thereby allowing a tighter fit of baffle assembly 220 to FoV and blocking more rays of stray light. A mounting bracket can be further included in baffle assembly 200 to fasten baffle assembly 200 and the optical sensor. For example, a pin extending out of an optical sensor can go through the mounting bracket to engage with baffle assembly 200. The position of baffle assembly 200 relative to the optical sensor can be adjusted via the mounting bracket.

In some examples, holes on baffle assembly 200 (e.g., holes to receive pins of an optical sensor) can include compression limiters to protect the molded plastic components of baffle assembly 200 from any compressive loads generated by tightening bolts, pegs, or screws to attach baffle assembly 200 to the optical sensor.

In some aspects, baffle housing 210 can be manufactured through the injection molding technique. The injection molding process can produce a plastic baffle assembly that can serve all of the functions described herein in an inexpensive and practical manner.

Figure 3A:
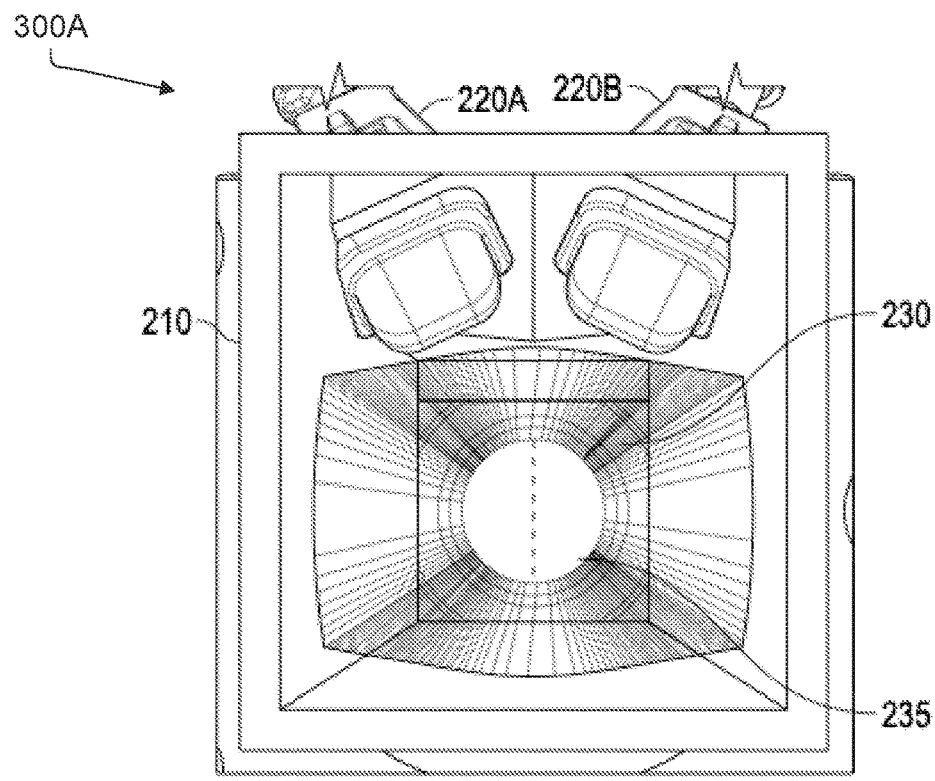
FIG. 3A illustrates an example front view of a baffle assembly for an optical sensor, according to some aspects of the present disclosure.

FIG. 3A illustrates an example front view 300A of baffle assembly 200 of FIG. 2. Baffle assembly 200 can have nozzle(s) 220A and 220B mounted on the top surface (upper quadrant) of baffle housing 210. Further, baffle assembly 200 can be coupled to optical sensor 230 at a proximal edge. Nozzle(s) 220A and 200B can be positioned to project fluid towards the surface of lens 235 of optical sensor 230.

Figure 3B:
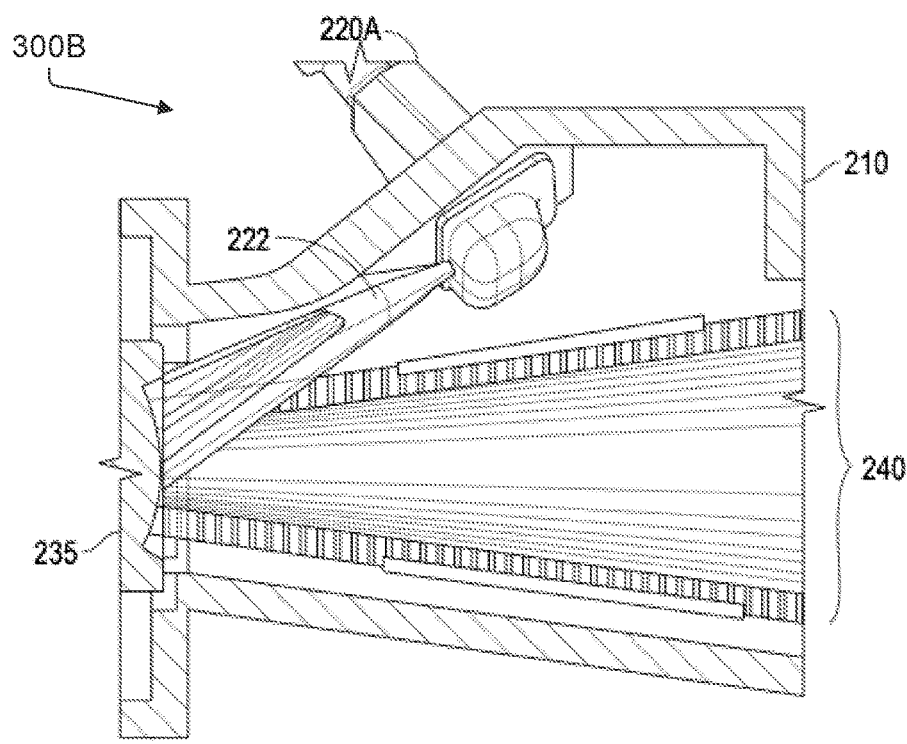
FIG. 3B illustrates an example sectional view of a baffle assembly for an optical sensor, according to some aspects of the present disclosure.

FIG. 3B illustrates an example sectional view 300B of baffle assembly 200 of FIG. 2. As shown in FIG. 3B, baffle housing 210 is configured to at least partially enclose FoV 240 of the optical sensor (more specifically, lens 235) to prevent stray light from reaching the focal plane or lens 235 of the optical sensor. Baffle housing 210 encloses FoV 240 tightly at the distal edge (away from lens 235) and loosely at the proximal edge (near lens 235).

Further, nozzle(s) 220 are configured to project fluid 222 towards the surface of lens 235. Nozzle(s) 220 can be positioned outside of FoV 240 not to interrupt intended rays of light entering the focal plane.

Figure 4:
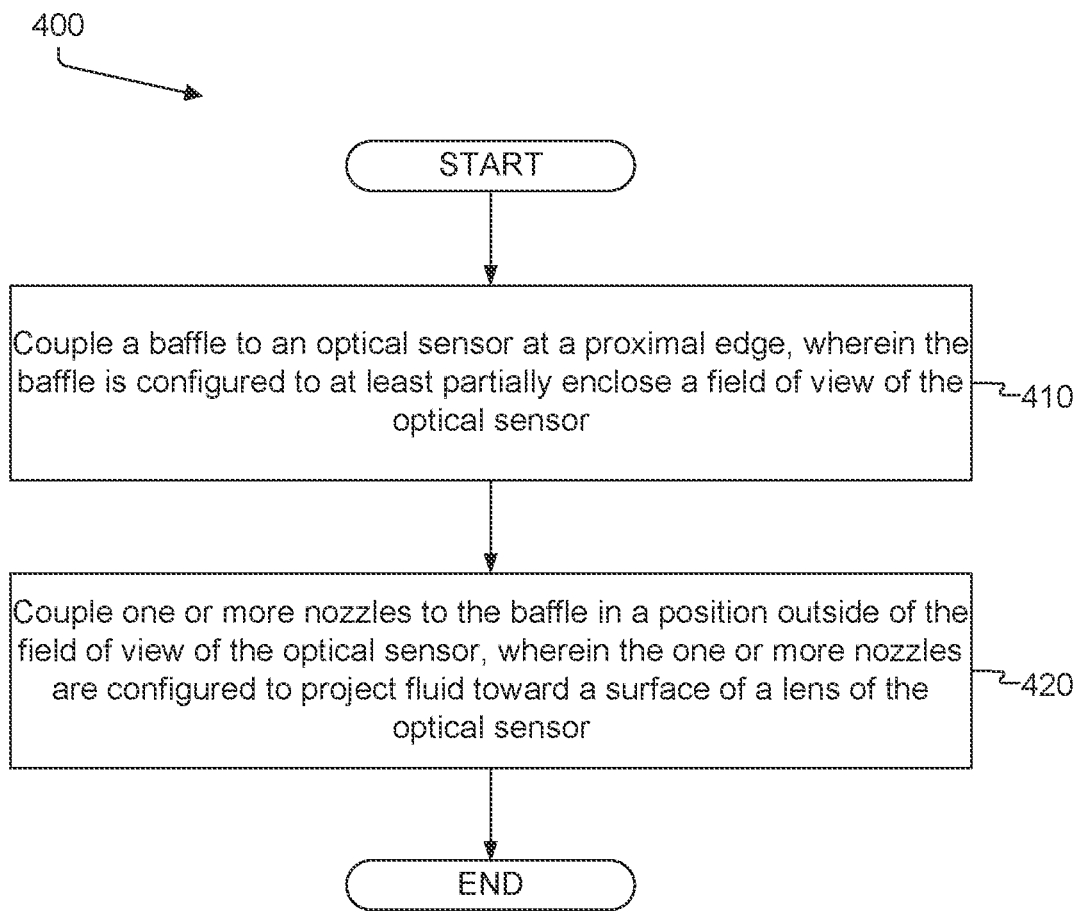
FIG. 4 illustrates an example process for assembling a baffle assembly for an optical sensor, according to some aspects of the present disclosure.

FIG. 4 illustrates an example of a process 400 for assembling a baffle assembly for an optical sensor. At step 410, process 400 includes coupling a baffle (e.g., baffle housing 210) to an optical sensor (e.g., optical sensor 230) at a proximal edge. The baffle is configured to at least partially enclose a field of view (e.g., FoV 240) of the optical sensor.

At step 420, process 400 includes coupling one or more nozzles (e.g., nozzles 220A and 220B) to the baffle (e.g., baffle housing 210) in a position outside of the field of view (e.g., FoV 240) of the optical sensor (e.g., optical sensor 230). The nozzles are configured to project fluid (e.g., fluid 222) toward a surface of a lens (e.g., lens 235) of the optical sensor.

In some aspects, baffle housing 210 can have a frustum shape, which is also referred to as a truncated pyramid. The frustum shape can provide stray light mitigation, easy cleaning, and low debris accumulation. Baffle assembly 200 can have any applicable shape that is suited to block reflected light coming from outside of an FoV. In some examples, a baffle assembly design can be optimized by using a reverse ray trace to identify and minimize 1st order paths from critical and illuminated surfaces. Further, the size of baffle housing 210 (e.g., length) can be adjusted based on the size of an optical sensor, lens, or nozzle(s) 220.

FIG. 5 illustrates an example of an AV management system 500, in which a baffle assembly system of the present technology can be implemented. One of ordinary skill in the art will understand that, for the AV management system 500 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 500 includes an AV 502, a data center 550, and a client computing device 570. The AV 502, the data center 550, and the client computing device 570 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 502 can navigate roadways without a human driver based on sensor signals generated by multiple sensor systems 504, 506, and 508. The sensor systems 504-508 can include different types of sensors and can be arranged about the AV 502. For instance, the sensor systems 504-508 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 504 can be a camera system, the sensor system 506 can be a LIDAR system, and the sensor system 508 can be a RADAR system. Other embodiments may include any other number and type of sensors.

The AV 502 can also include several mechanical systems that can be used to maneuver or operate the AV 502. For instance, the mechanical systems can include a vehicle propulsion system 530, a braking system 532, a steering system 534, a safety system 536, and a cabin system 538, among other systems. The vehicle propulsion system 530 can include an electric motor, an internal combustion engine, or both. The braking system 532 can include an engine brake, brake pads, actuators, and/or any other suitable componentry configured to assist in decelerating the AV 502. The steering system 534 can include suitable componentry configured to control the direction of movement of the AV 502 during navigation. The safety system 536 can include lights and signal indicators, a parking brake, airbags, and so forth. The cabin system 538 can include cabin temperature control systems, in-cabin entertainment systems, and so forth. In some embodiments, the AV 502 might not include human driver actuators (e.g., steering wheel, handbrake, foot brake pedal, foot accelerator pedal, turn signal lever, window wipers, etc.) for controlling the AV 502. Instead, the cabin system 538 can include one or more client interfaces (e.g., Graphical User Interfaces (GUIs), Voice User Interfaces (VUIs), etc.) for controlling certain aspects of the mechanical systems 530-538.

The AV 502 can additionally include a local computing device 510 that is in communication with the sensor systems 504-508, the mechanical systems 530-538, the data center 550, and the client computing device 570, among other systems. The local computing device 510 can include one or more processors and memory, including instructions that can be executed by the one or more processors. The instructions can make up one or more software stacks or components responsible for controlling the AV 502; communicating with the data center 550, the client computing device 570, and other systems; receiving inputs from riders, passengers, and other entities within the AV's environment; logging metrics collected by the sensor systems 504-508; and so forth. In this example, the local computing device 510 includes a perception stack 512, a mapping and localization stack 514, a prediction stack 516, a planning stack 518, a communications stack 520, a control stack 522, an AV operational database 524, and an HD geospatial database 526, among other stacks and systems.

The perception stack 512 can enable the AV 502 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 504-508, the mapping and localization stack 514, the HD geospatial database 526, other components of the AV, and other data sources (e.g., the data center 550, the client computing device 570, third party data sources, etc.). The perception stack 512 can detect and classify objects and determine their current locations, speeds, directions, and the like. In addition, the perception stack 512 can determine the free space around the AV 502 (e.g., to maintain a safe distance from other objects, change lanes, park the AV, etc.). The perception stack 512 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 514 can determine the AV's position and orientation (pose) using different methods from multiple systems (e.g., GPS, IMUs, cameras, LIDAR, RADAR, ultrasonic sensors, the HD geospatial database 526, etc.). For example, in some embodiments, the AV 502 can compare sensor data captured in real-time by the sensor systems 504-508 to data in the HD geospatial database 526 to determine its precise (e.g., accurate to the order of a few centimeters or less) position and orientation. The AV 502 can focus its search based on sensor data from one or more first sensor systems (e.g., GPS) by matching sensor data from one or more second sensor systems (e.g., LIDAR). If the mapping and localization information from one system is unavailable, the AV 502 can use mapping and localization information from a redundant system and/or from remote data sources.

The prediction stack 516 can receive information from the localization stack 514 and objects identified by the perception stack 512 and predict a future path for the objects. In some embodiments, the prediction stack 516 can output several likely paths that an object is predicted to take along with a probability associated with each path. For each predicted path, the prediction stack 516 can also output a range of points along the path corresponding to a predicted location of the object along the path at future time intervals along with an expected error value for each of the points that indicates a probabilistic deviation from that point.

The planning stack 518 can determine how to maneuver or operate the AV 502 safely and efficiently in its environment. For example, the planning stack 518 can receive the location, speed, and direction of the AV 502, geospatial data, data regarding objects sharing the road with the AV 502 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 502 from one point to another and outputs from the perception stack 512, localization stack 514, and prediction stack 516. The planning stack 518 can determine multiple sets of one or more mechanical operations that the AV 502 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 518 can select from multiple backup plans to carry out. For example, while preparing to change lanes to turn right at an intersection, another vehicle may aggressively cut into the destination lane, making the lane change unsafe. The planning stack 518 could have already determined an alternative plan for such an event. Upon its occurrence, it could help direct the AV 502 to go around the block instead of blocking a current lane while waiting for an opening to change lanes.

The control stack 522 can manage the operation of the vehicle propulsion system 530, the braking system 532, the steering system 534, the safety system 536, and the cabin system 538. The control stack 522 can receive sensor signals from the sensor systems 504-508 as well as communicate with other stacks or components of the local computing device 510 or a remote system (e.g., the data center 550) to effectuate operation of the AV 502. For example, the control stack 522 can implement the final path or actions from the multiple paths or actions provided by the planning stack 518. This can involve turning the routes and decisions from the planning stack 518 into commands for the actuators that control the AV's steering, throttle, brake, and drive unit.

The communications stack 520 can transmit and receive signals between the various stacks and other components of the AV 502 and between the AV 502, the data center 550, the client computing device 570, and other remote systems. The communications stack 520 can enable the local computing device 510 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 520 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 526 can store HD maps and related data of the streets upon which the AV 502 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 524 can store raw AV data generated by the sensor systems 504-508, stacks 512-522, and other components of the AV 502 and/or data received by the AV 502 from remote systems (e.g., the data center 550, the client computing device 570, etc.). In some embodiments, the raw AV data can include HD LIDAR point cloud data, image data, RADAR data, GPS data, and other sensor data that the data center 550 can use for creating or updating AV geospatial data or for creating simulations of situations encountered by AV 502 for future testing or training of various machine learning algorithms that are incorporated in the local computing device 510.

The data center 550 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 550 can include one or more computing devices remote to the local computing device 510 for managing a fleet of AVs and AV-related services. For example, in addition to managing the AV 502, the data center 550 may also support a ridesharing service, a delivery service, a remote/roadside assistance service, street services (e.g., street mapping, street patrol, street cleaning, street metering, parking reservation, etc.), and the like.

The data center 550 can send and receive various signals to and from the AV 502 and the client computing device 570. These signals can include sensor data captured by the sensor systems 504-508, roadside assistance requests, software updates, ridesharing pick-up and drop-off instructions, and so forth. In this example, the data center 550 includes a data management platform 552, an Artificial Intelligence/Machine Learning (AI/ML) platform 554, a simulation platform 556, a remote assistance platform 558, and a ridesharing platform 560, and a map management platform 562, among other systems.

The data management platform 552 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 550 can access data stored by the data management platform 552 to provide their respective services.

The AI/ML platform 554 can provide the infrastructure for training and evaluating machine learning algorithms for operating the AV 502, the simulation platform 556, the remote assistance platform 558, the ridesharing platform 560, the map management platform 562, and other platforms and systems. Using the AI/ML platform 554, data scientists can prepare data sets from the data management platform 552; select, design, and train machine learning models; evaluate, refine, and deploy the models; maintain, monitor, and retrain the models; and so on.

The simulation platform 556 can enable testing and validation of the algorithms, machine learning models, neural networks, and other development efforts for the AV 502, the remote assistance platform 558, the ridesharing platform 560, the map management platform 562, and other platforms and systems. The simulation platform 556 can replicate a variety of driving environments and/or reproduce real-world scenarios from data captured by the AV 502, including rendering geospatial information and road infrastructure (e.g., streets, lanes, crosswalks, traffic lights, stop signs, etc.) obtained from a cartography platform (e.g., map management platform 562); modeling the behavior of other vehicles, bicycles, pedestrians, and other dynamic elements; simulating inclement weather conditions, different traffic scenarios; and so on.

The remote assistance platform 558 can generate and transmit instructions regarding the operation of the AV 502. For example, in response to an output of the AI/ML platform 554 or other system of the data center 550, the remote assistance platform 558 can prepare instructions for one or more stacks or other components of the AV 502.

The ridesharing platform 560 can interact with a customer of a ridesharing service via a ridesharing application 572 executing on the client computing device 570. The client computing device 570 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 572. The client computing device 570 can be a customer's mobile computing device or a computing device integrated with the AV 502 (e.g., the local computing device 510). The ridesharing platform 560 can receive requests to pick up or drop off from the ridesharing application 572 and dispatch the AV 502 for the trip.

Map management platform 562 can provide a set of tools for the manipulation and management of geographic and spatial (geospatial) and related attribute data. The data management platform 552 can receive LIDAR point cloud data, image data (e.g., still image, video, etc.), RADAR data, GPS data, and other sensor data (e.g., raw data) from one or more AVs 502, Unmanned Aerial Vehicles (UAVs), satellites, third-party mapping services, and other sources of geospatially referenced data. The raw data can be processed, and map management platform 562 can render base representations (e.g., tiles (2D), bounding volumes (3D), etc.) of the AV geospatial data to enable users to view, query, label, edit, and otherwise interact with the data. Map management platform 562 can manage workflows and tasks for operating on the AV geospatial data. Map management platform 562 can control access to the AV geospatial data, including granting or limiting access to the AV geospatial data based on user-based, role-based, group-based, task-based, and other attribute-based access control mechanisms. Map management platform 562 can provide version control for the AV geospatial data, such as to track specific changes that (human or machine) map editors have made to the data and to revert changes when necessary. Map management platform 562 can administer release management of the AV geospatial data, including distributing suitable iterations of the data to different users, computing devices, AVs, and other consumers of HD maps. Map management platform 562 can provide analytics regarding the AV geospatial data and related data, such as to generate insights relating to the throughput and quality of mapping tasks.

In some embodiments, the map viewing services of map management platform 562 can be modularized and deployed as part of one or more of the platforms and systems of the data center 550. For example, the AI/ML platform 554 may incorporate the map viewing services for visualizing the effectiveness of various object detection or object classification models, the simulation platform 556 may incorporate the map viewing services for recreating and visualizing certain driving scenarios, the remote assistance platform 558 may incorporate the map viewing services for replaying traffic incidents to facilitate and coordinate aid, the ridesharing platform 560 may incorporate the map viewing services into the client application 572 to enable passengers to view the AV 502 in transit en route to a pick-up or drop-off location, and so on.

Figure 6:
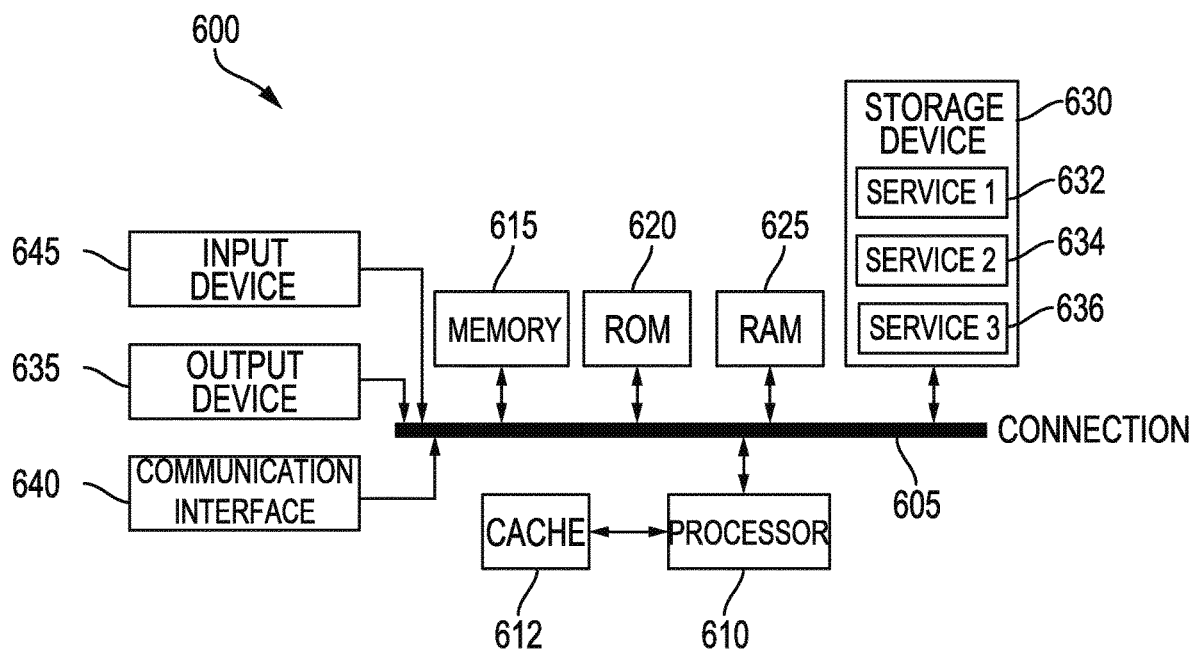
FIG. 6 illustrates an example processor-based system with which some aspects of the subject technology can be implemented, according to some aspects of the present disclosure.

FIG. 6 illustrates an example computing system 600 including components in electrical communication with each other using a connection 605 upon which one or more aspects of the present disclosure can be implemented. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

Storage device 630 can include software services, servers, services, etc., that when the code that defines such software is executed by processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. An autonomous vehicle comprising:
   an optical sensor mounted on the autonomous vehicle; and
   a baffle assembly coupled to the optical sensor, the baffle assembly comprising: a baffle housing coupled to the optical sensor at a proximal edge, and configured to at least partially enclose a field of view of the optical sensor; and one or more nozzles coupled to the baffle housing and configured to project fluid toward a surface of a lens of the optical sensor;
   wherein at least a part of an inner surface of the baffle housing is opaque to diffuse reflection of light coming from outside of the field of view of the optical sensor.

2. The autonomous vehicle of claim 1, wherein at least a part of an inner surface of the baffle housing is configured to diffuse incident light.

3. The autonomous vehicle of claim 1, wherein the baffle housing has a temperature controllable surface.

4. The autonomous vehicle of claim 1, wherein the one or more nozzles are positioned outside of the field of view of the optical sensor.

5. The autonomous vehicle of claim 1, wherein the one or more nozzles have a textured surface to reduce reflection of light on the surface of the nozzles.

6. The autonomous vehicle of claim 1, wherein one of the one or more nozzles is configured to clean an inner surface of the baffle housing.

7. The autonomous vehicle of claim 1, wherein the optical sensor is a camera, a Light Detection and Ranging (LiDAR) sensor, or a combination thereof.

8. The autonomous vehicle of claim 1, wherein the baffle assembly further comprises a removable awning coupled to a distal edge of the baffle housing.

9. The autonomous vehicle of claim 1, wherein the baffle assembly further comprises a drain port along a bottom side of the baffle housing below the lens.

10. The autonomous vehicle of claim 1, wherein the baffle assembly further comprises one or more ventilation holes configured to permit airflow across the lens.

11. A baffle assembly for an optical sensor comprising:
a baffle housing configured to be coupled to the optical sensor at a proximal edge and at least partially enclose a field of view of the optical sensor; and
one or more nozzles coupled to the baffle housing and configured to project fluid toward a surface of a lens of the optical sensor;
wherein the one or more nozzles have a textured surface to reduce reflection of light on the surface of the nozzles.

12. The baffle assembly of claim 11, wherein at least a part of an inner surface of the baffle housing is configured to diffuse incident light.

13. The baffle assembly of claim 11, wherein at least a part of an inner surface of the baffle housing is opaque to diffuse reflection of light coming from outside of the field of view of the optical sensor.

14. The baffle assembly of claim 11, wherein the one or more nozzles are positioned outside of the field of view of the optical sensor.

15. The baffle assembly of claim 11, further comprising:
a removable awning coupled to a distal edge of the baffle housing.

16. The baffle assembly of claim 11, further comprising:
a drain port along a bottom side of the baffle housing below the lens of the optical sensor.

17. The baffle assembly of claim 11, further comprising:
one or more ventilation holes configured to permit airflow across the lens.

18. A method comprising:
coupling a baffle to an optical sensor at a proximal edge, wherein the baffle is configured to at least partially enclose a field of view of the optical sensor;
coupling one or more nozzles to the baffle in a position outside of the field of view of the optical sensor, wherein the one or more nozzles are configured to project fluid toward a surface of a lens of the optical sensor; and
coupling a removable awning coupled to a distal edge of the baffle housing.

\* \* \* \* \*